United States Patent
Aoyama

(10) Patent No.: US 11,949,839 B2
(45) Date of Patent: Apr. 2, 2024

(54) IMAGE FORMING APPARATUS AND CONTROL METHOD WITH REQUESTING USER IMAGE CAPTURE

(71) Applicant: TOSHIBA TEC KABUSHIKI KAISHA, Tokyo (JP)

(72) Inventor: Ryuichi Aoyama, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/145,587

(22) Filed: Dec. 22, 2022

(65) Prior Publication Data

US 2023/0328192 A1 Oct. 12, 2023

(30) Foreign Application Priority Data

Mar. 23, 2022 (JP) .................. 2022-047135

(51) Int. Cl.
*H04N 1/44* (2006.01)
*G06V 40/16* (2022.01)

(52) U.S. Cl.
CPC ......... *H04N 1/4433* (2013.01); *G06V 40/172* (2022.01)

(58) Field of Classification Search
CPC .... H04N 1/4433; G06V 40/172; G06F 21/32; G06F 21/31; G06F 3/0482
See application file for complete search history.

(56) References Cited

U.S. PATENT DOCUMENTS

2019/0266256 A1\* 8/2019 Dudani ................ G06F 16/113
2020/0380103 A1\* 12/2020 Hosoda .................. G06F 21/35

FOREIGN PATENT DOCUMENTS

| JP | 2015-080265 A | 4/2015 |
| JP | 2017-062680 A | 3/2017 |
| JP | 2019-080182 A | 5/2019 |

\* cited by examiner

*Primary Examiner* — Iriana Cruz
(74) *Attorney, Agent, or Firm* — FOLEY & LARDNER LLP

(57) ABSTRACT

An image forming apparatus includes an image sensor configured to capture image data and a controller operatively coupled to the image sensor. The controller is configured to receive, from the image sensor, a requesting user image of a requesting user who requests authentication to use the image forming apparatus. The controller is configured to transmit the requesting user image to a terminal associated with an authenticating user that is authorized to authenticate the requesting user. The controller is configured to acquire, from the terminal, an authentication result indicating whether the authenticating user authenticates the requesting user to use the image forming apparatus.

17 Claims, 7 Drawing Sheets

| IDENTIFICATION INFORMATION | USE AUTHORITY | CONNECTION DESTINATION ADDRESS | STATUS |
|---|---|---|---|
| A | 0011 | adA | BUSY |
| B | 1111 | adB | AVAILABLE FOR RESPONSE |
| C | 1011 | adC | AVAILABLE FOR RESPONSE |
| ... | ... | ... | ... |

IMAGE FORMING APPARATUS AND CONTROL METHOD WITH REQUESTING USER IMAGE CAPTURE

CROSS-REFERENCE TO RELATED APPLICATION

This application is based upon and claims the benefit of priority from Japanese Patent Application No. 2022-047135, filed on Mar. 23, 2022, the entire contents of which are incorporated herein by reference.

FIELD

Embodiments described herein relate generally to an image forming apparatus and a control method.

BACKGROUND

In the related art, there is a technology for authenticating a user when using an image forming apparatus.

As the above technology, there is a technology that performs face authentication of a user using a camera mounted on the image forming apparatus. A user who can be authenticated by this technology is a user who is set as an authentication target in advance, and thus other users cannot use the image forming apparatus.

As another technology, there is a technology that allows an issuer to select permission or non-permission of private printing that the issuer instructs the image forming apparatus to perform if a user other than the issuer executes the private printing. The user other than the issuer in this technology is only permitted to perform private printing. That is, the user other than the issuer is not permitted to use the image forming apparatus for purposes other than the private printing.

As described above, the user authentication in the image forming apparatus in the related art has a problem that only the user who is set as the authentication target in advance can be authenticated.

DETAILED DESCRIPTION

Embodiments provide an image forming apparatus and a control method capable of authenticating even a user who is not set as an authentication target in advance.

In general, according to one embodiment, an image forming apparatus includes an image sensor and a controller operatively coupled to the image sensor. The image sensor is configured to capture image data. The controller is configured to receive, from the image sensor, a requesting user image of a requesting user who requests authentication to use the image forming apparatus. The controller is configured to transmit the requesting user image to a terminal associated with an authenticating user that is authorized to authenticate the requesting user. The controller is configured to acquire, from the terminal, an authentication result indicating whether the authenticating user authenticates the requesting user to use the image forming apparatus.

Hereinafter, the image forming apparatus and the control method according to embodiments will be described with reference to the drawings. In the image forming apparatus according to the embodiment, even a user who is not set as an authentication target in advance can be authenticated.

Figure 1:
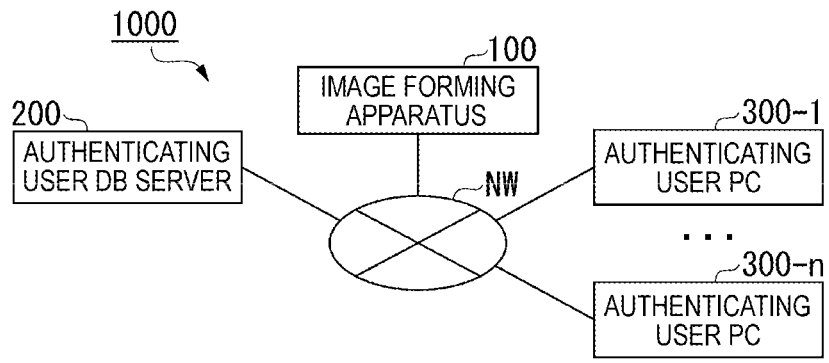
FIG. 1 is a diagram illustrating a configuration example of an authentication system according to an embodiment.

FIG. 1 is a diagram illustrating a configuration example of an authentication system 1000 including an image forming apparatus 100 according to the embodiment. The authentication system 1000 includes the image forming apparatus 100, an authenticating user database (DB) server 200, and authenticating user personal computers (PCs) 300-1, . . . , 300-n (n is an integer of 1 or more). In the following description, the authenticating user PCs 300-1, . . . , 300-n will be referred to as an authenticating user PC 300 unless otherwise distinguished. The authenticating user PC 300 is an example of a terminal used by an authenticating user.

The image forming apparatus 100, the authenticating user DB server 200, and the authenticating user PC 300 can communicate with each other via a network NW. The authenticating user DB server 200 is a server that stores an authenticating user DB as described later, but the image forming apparatus 100 may store the authenticating user DB, in which case the authenticating user DB server 200 is not needed.

In the authentication system 1000 described above, a requesting user who requests authentication for using the image forming apparatus 100 is imaged (e.g., an image of the requesting user is captured). A requesting user image indicating the requesting user obtained by imaging is transmitted to the authenticating user PC 300 used by the authenticating user who authenticates the requesting user. The requesting user image is displayed on the authenticating user PC 300. The authenticating user determines whether to authenticate the requesting user using the displayed requesting user image. The authenticating user inputs an authentication result to the authenticating user PC 300. The authenticating user PC 300 transmits the authentication result to the image forming apparatus 100. The image forming apparatus 100 acquires the authentication result by the authenticating user. If the authentication result indicates that the authentication is accepted, the image forming apparatus 100 permits the requesting user to use the image forming apparatus 100. If the authentication result indicates that the authentication is rejected, the image forming apparatus 100 does not permit the requesting user to use the image forming apparatus 100.

Figure 2:
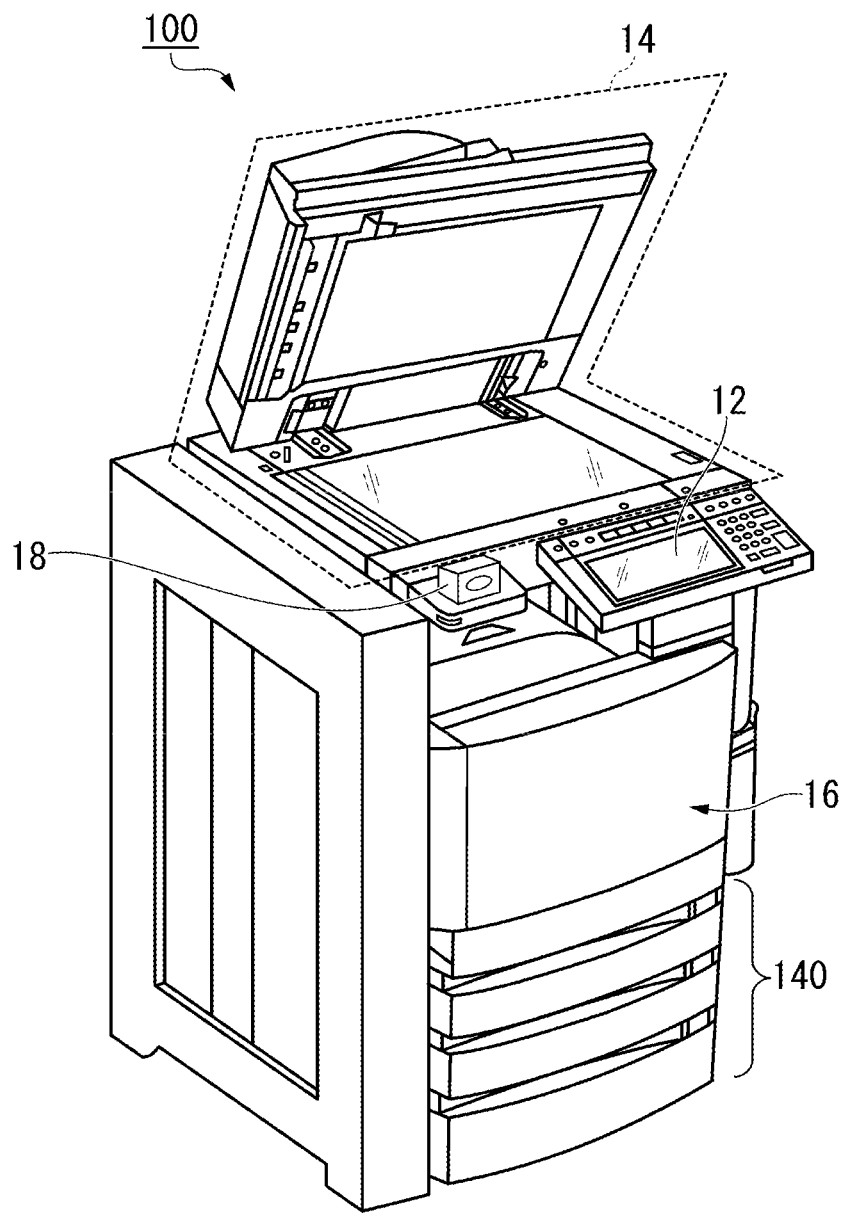
FIG. 2 is a perspective view illustrating an example of the overall configuration of an image forming apparatus.

FIG. 2 is an external diagram illustrating an example of the overall configuration of the image forming apparatus 100 according to the embodiment. The image forming apparatus 100 according to the embodiment is, for example, a multifunction machine, and has a copy function, a printer function, a scanner function, and a facsimile function.

The image forming apparatus 100 includes a control panel 12, a scanner 14, a printer 16, a camera 18, a sheet accommodation portion 140, and a system controller 1.

The printer 16 forms an image on a sheet using a developer, such as toner. The sheet is, for example, paper or label paper. Any kind of sheet may be used as long as the image forming apparatus 100 can form an image on the surface of the sheet.

The scanner 14 reads image information of a reading target based on brightness and darkness of light. The scanner 14 records the read image information in a main memory 4 of the system controller 1. The recorded image information may be transmitted to another information processing apparatus via a network. The recorded image information may be image-formed on the sheet by the printer 16.

The control panel 12 (e.g., a user interface or operator interface) includes a display and a plurality of buttons. The display is an image display device such as a liquid crystal display or an organic electro luminescence (EL) display. The display is provided with a touch panel. The display displays various pieces of information about the image forming apparatus 100. The control panel 12 receives an operation of a user.

The sheet accommodation portion 140 accommodates sheets used for image formation in the printer 16.

The printer 16 forms an image on the sheet based on image information generated by the scanner 14 or received via a communication path. The printer 16 forms an image by, for example, the following processing. An image forming unit of the printer 16 forms an electrostatic latent image on a photosensitive drum based on the image information. The image forming unit of the printer 16 forms a visible image by allowing the developer to adhere to the electrostatic latent image. A transfer unit of the printer 16 transfers the visible image onto the sheet. A fixing unit of the printer 16 fixes the visible image on the sheet by applying heat and pressure to the sheet. The sheet on which an image is formed may be a sheet accommodated in the sheet accommodation portion 140 or may be a manually fed sheet.

Figure 3:
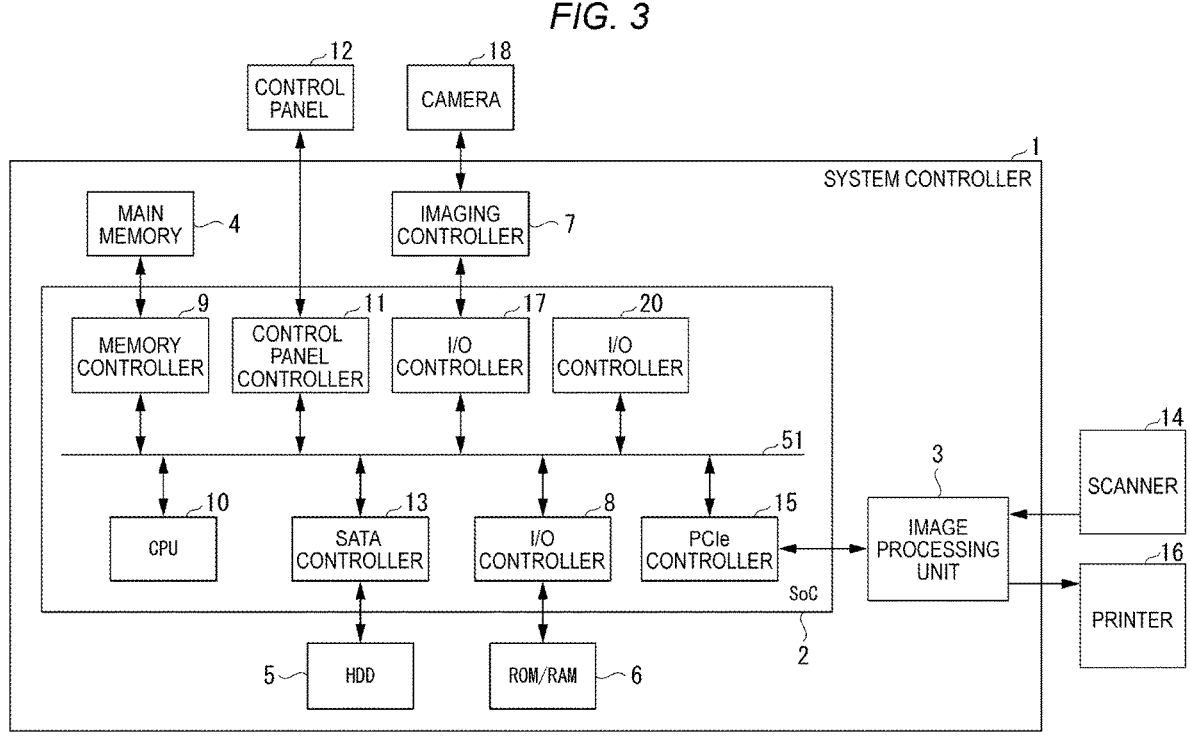
FIG. 3 is a block diagram illustrating a configuration of a system controller that is a control system.

FIG. 3 is a block diagram illustrating a configuration of the system controller 1, which is a control system of the image forming apparatus 100 according to the embodiment. In FIG. 3, the system controller 1 includes a system LSI 2, an image processing unit 3, the main memory 4, an HDD 5, a ROM and/or RAM 6, and an imaging controller 7. The system controller 1 is also connected to the control panel 12, the camera 18, the scanner 14, and the printer 16.

The system LSI 2 is a chip called system on chip (SoC). The system LSI 2 includes an internal bus 51 capable of high speed communication. A memory controller 9, a CPU 10, a control panel controller 11, and a serial advanced technology attachment (SATA) controller 13 are connected to the internal bus 51. Furthermore, I/O controllers 8, 17, and 20 and a peripheral component interconnect express (PCIe) controller 15 are connected to the internal bus 51.

The CPU 10 controls the overall operation of the image forming apparatus 100. Specifically, the CPU 10 causes a control program stored in the ROM and/or RAM 6 to reside in the main memory 4, and controls each unit based on the contents of the program. The memory controller 9 controls reading of a resident program from the main memory 4, storing of image data in the main memory 4, and reading of image data from the main memory 4, according to an instruction from the CPU 10. The main memory 4 has an area capable of storing image information for a plurality of pages, and can store image information from the scanner 14 for each page, for example.

The SATA controller 13 connects the system LSI 2 and the HDD 5. The HDD 5 compresses and stores image data read by the scanner 14 and the like. The I/O controller 8 connects the system LSI 2 and the ROM and/or RAM 6. The ROM 6 stores the control program and the like. The RAM 6 temporarily stores data.

The PCIe controller 15 connects the system LSI 2 and the image processing unit 3. The image processing unit 3 performs compression processing and the like on image data output from the scanner 14. The image processing unit 3 performs processing such as decompression of the image data and outputs the decompressed image data to the printer 16.

The control panel controller 11 connects the system LSI 2 and the control panel 12. The control panel controller 11 controls the control panel 12 according to an instruction from the CPU 10. The control panel controller 11 includes an I/O controller and an LCD controller. The control panel controller 11 displays various pieces of information on the control panel 12 or outputs the operation contents of the user to the CPU 10.

The I/O controller 17 connects the system LSI 2 and the imaging controller 7. The imaging controller 7 is connected to the camera 18. The camera 18 is an example of the imaging unit (e.g., an image sensor). The imaging controller 7 controls the camera 18. Specifically, the imaging controller 7 instructs the camera 18 to image (e.g., generate image data of) a face of an approaching user according to an instruction from the CPU 10. Specifically, in the present embodiment, the camera 18 images the requesting user who requests authentication for using the image forming apparatus 100. Imaged face data (for example, a requesting user image) indicating the imaged face of the user is stored in the main memory 4 via the I/O controller 17 or the like.

Figures 4, 5:
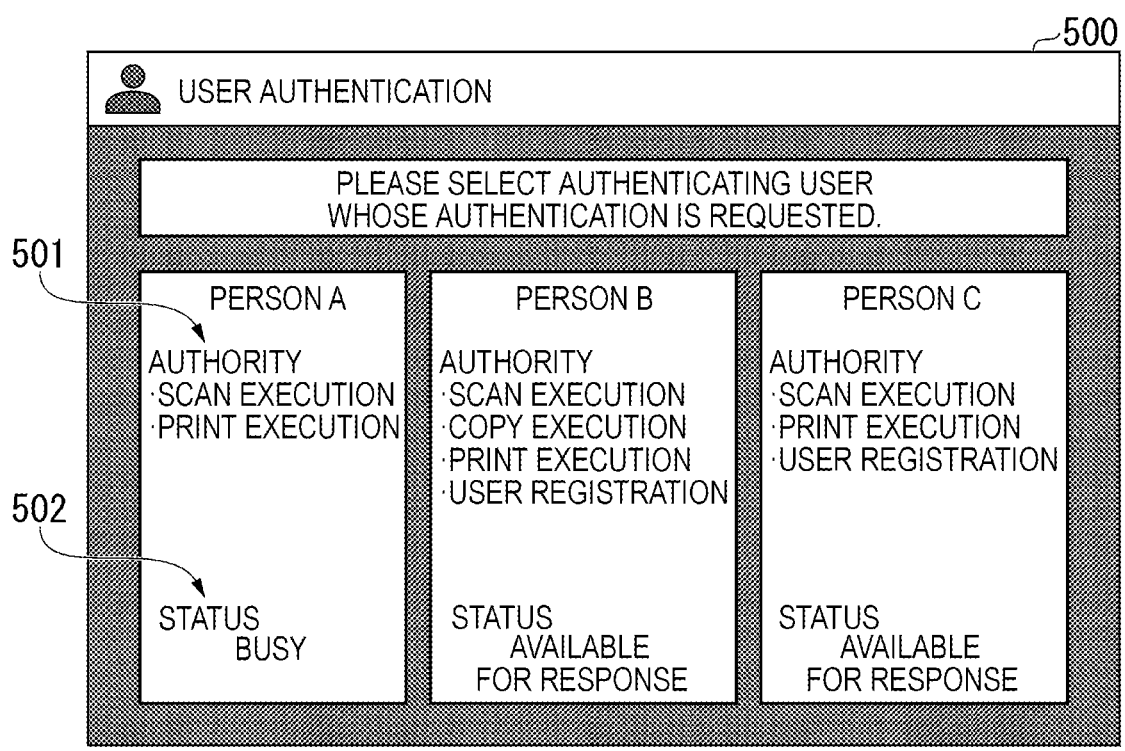
FIG. 4 is a table illustrating an example of an authenticating user DB.
FIG. 5 is a diagram illustrating an example of a selection screen.

FIG. 4 is a table illustrating an example of the authenticating user DB (e.g., an authenticating user database) stored in the authenticating user DB server 200. The authenticating user DB is a database that stores information about authenticating users who authenticate requesting users. The authenticating user DB is configured with identification information, use authority, connection destination address, and status. The identification information is information that uniquely identifies the authenticating user. The use authority (herein sometimes simply referred to as "authority") indicates authority granted to the authenticating user (e.g., which functions the authenticating user has authority or permission to perform or grant to a requesting user). Details of the authority will be described later. The connection destination address indicates information for connecting to the authenticating user PC, and is an IP address, for example.

The status indicates state information indicating whether the authenticating user is in a state of being available to authenticate the requesting user. In the present embodiment, "busy", "available for response", and "offline" are provided as statuses. "Busy" indicates that the authenticating user is currently busy with something and is having difficulty in performing authentication. "Available for response" indicates that authentication is currently possible. "Offline" indicates that the authenticating user PC cannot be connected, and in this case, the authenticating user cannot, of course, perform authentication. As the status, an authentication period other than the statuses described above may be provided. Examples of the authentication period include an authentication period such as "Authentication is possible until 1:00 p.m." and "Authentication is possible from 3:00 p.m. to 5:00 p.m.", or a period during which authentication is not possible.

The authority described above will be described. In the present embodiment, the authority that can be granted to the authenticating user includes "scan execution", "copy execution", "print execution", and "user registration". "Scan execution" is the authority to execute the scanner function of the image forming apparatus 100. "Copy execution" is the authority to execute the copy function of the image forming apparatus 100. "Print execution" is the authority to execute the printer function of the image forming apparatus 100. "User registration" is the authority to newly register a user who uses the image forming apparatus 100.

Therefore, a user to whom "scan execution" is granted can use the scanner function. A user to whom "copy execution" is granted can use the copy function. A user to whom "print execution" is granted can use the printer function. A user to whom "user registration" is granted can newly register a user who uses the image forming apparatus 100.

In the authenticating user DB, the presence or absence of the four authorities described above is indicated by 4 bits. If the authority is granted, a bit corresponding to the authority is indicated by "1", and if the authority is not granted, the bit corresponding to the authority is indicated by "0". Description will be made in order from the lowermost bit to the uppermost bit of the 4 bits. The first bit indicates whether "scan execution" is granted. The second bit indicates whether "print execution" is granted. The third bit indicates whether "copy execution" is granted. The fourth bit indicates whether "user registration" is granted.

In FIG. 4, for example, an authenticating user A is granted "scan execution" and "print execution", but not "copy execution" and "user registration". The authorities granted to such an authenticating user are related to the authorities granted to the requesting user authenticated by the authenticating user. Specifically, the use authority for the image forming apparatus 100 granted to the requesting user if the requesting user is authenticated (e.g., a first use authority) is within the use authority granted to the authenticating user who authenticates the requesting user (e.g., a second use authority). In other words, the use authority that the authenticating user can grant to the requesting user may be limited to the functions within the use authority of the authenticating user, and an authenticating user may not be able to grant permission to use a function outside of the authenticating user's use authority. Therefore, the authority granted to the requesting user authenticated by the authenticating user A is "scan execution" and "print execution", only "scan execution", or only "print execution". The presence or absence of authority may be managed using a list of authorities without using bits.

Next, based on the configuration described above, an example of a screen displayed on the control panel 12 by the image forming apparatus 100 to the requesting user will be described. FIG. 5 is a diagram illustrating an example of a selection screen 500 displayed to the requesting user who requests authentication for using the image forming apparatus 100. If the requesting user inputs a request to display a selection screen, the image forming apparatus 100 acquires the identification information, use authority, connection destination address, and status described with reference to FIG. 4 from the authenticating user DB server 200.

As illustrated in FIG. 5, the image forming apparatus 100 displays a plurality of candidates for the authenticating user based on the acquired respective pieces of information, and displays the selection screen from which the requesting user can select an authenticating user from the displayed candidates. In the case of FIG. 5, the image forming apparatus 100 selectably displays three authenticating users: person A; person B; and person C, based on the acquired identification information. Further, the image forming apparatus 100 displays the granted authority for each authenticating user in an authority field 501, based on the acquired authority. Furthermore, the image forming apparatus 100 displays the status for each authenticating user in a status field 502, based on the acquired status. In this manner, the image forming apparatus 100 displays status information indicating whether the authenticating user can be authenticated, together with the candidates of the authenticating user.

For example, in FIG. 5, in the case of person C, "scan execution", "print execution", and "user registration" are displayed as the granted authorities, and the status is displayed as "available for response".

As described above, since the display and the control panel 12 are configured as an integrated touch panel (e.g., a touchscreen), if the requesting user touches the area where a desired authenticating user is displayed, the image forming apparatus 100 can specify the selected authenticating user.

Figure 6:
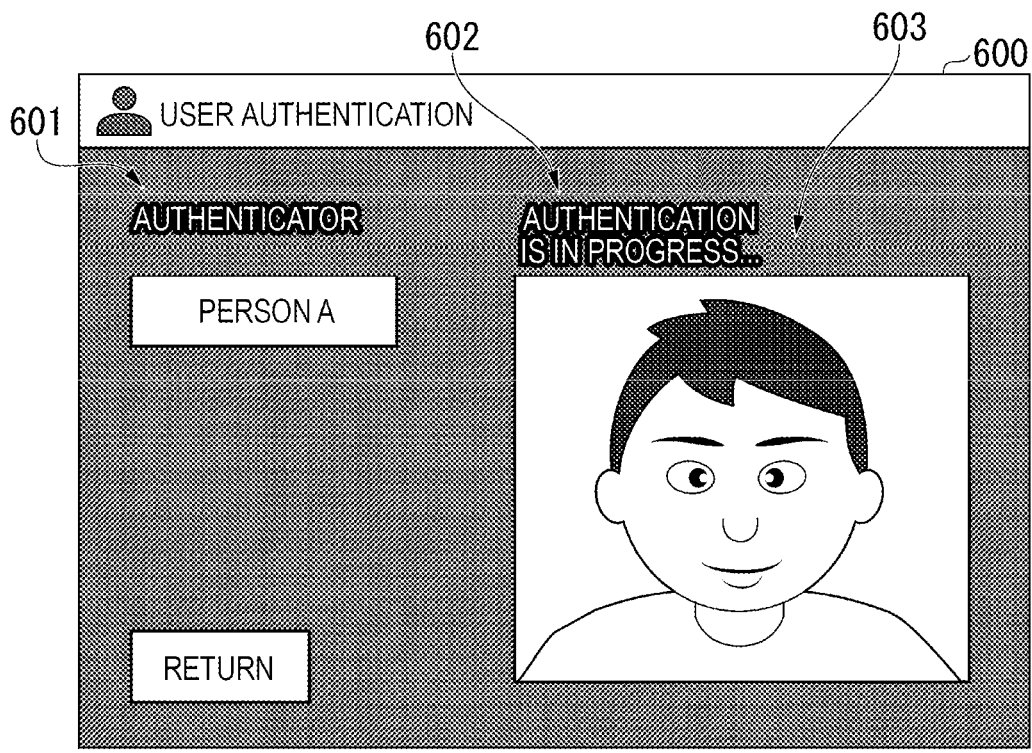
FIG. 6 is a diagram illustrating an example of an authentication in-progress screen.

If the requesting user selects the authenticating user, the image forming apparatus 100 displays an authentication in-progress screen. FIG. 6 is a diagram illustrating an example of an authentication in-progress screen 600. An authenticating user field 601, an authentication in-progress display 602, and an authenticating user image 603 are displayed in the example of the authentication in-progress screen 600. The example of the authentication in-progress screen 600 illustrates an example of a screen if the requesting user selects person A as the authenticating user. The authenticating user field 601 allows the requesting user to check the authenticating user that the requesting user chooses. The authentication in-progress display 602 allows the requesting user to check that the authenticating user is in the process of authenticating their request. The authenticating user image 603 may be an image of the authenticating user prepared in advance, or may be a current image of the authenticating user imaged by a camera provided in the authenticating user PC 300. If the return button is selected, the selection screen is displayed.

Figure 7:
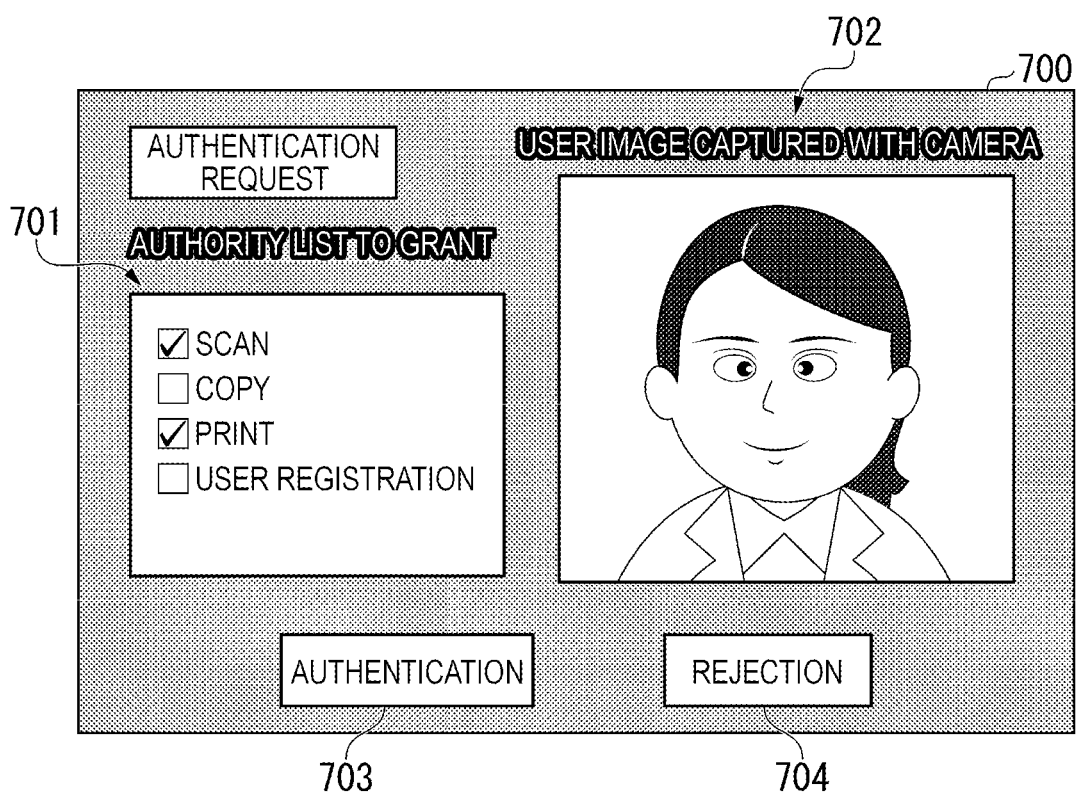
FIG. 7 is a diagram illustrating an example of an authentication acceptance and rejection screen.

If the requesting user selects the authenticating user on the selection screen, the image forming apparatus 100 notifies the connection destination address of the authenticating user of an authentication request indicating that authentication is requested by the requesting user. When receiving the authentication request, the authenticating user PC 300 displays an authentication acceptance and rejection screen. FIG. 7 is a diagram illustrating an example of an authentication acceptance and rejection screen 700 displayed on the authenticating user PC 300. As represented in the example of the authentication acceptance and rejection screen 700, an authority list 701, a requesting user image 702, an authentication button 703, and a rejection button 704 are displayed on the authentication acceptance and rejection screen.

The authority list 701 is a list that indicates the authorities granted to the requesting user. By checking a checkbox, the authenticating user can grant the authority to be granted to the requesting user within the authority granted to the authenticating user. The requesting user image 702 is a requesting user image. The requesting user image 702 is an image indicating a current requesting user acquired by the camera 18 of the image forming apparatus 100. The authenticating user PC 300 may display the requesting user image 702 in real time, or may periodically update the requesting user image 702 every predetermined timing (for example, 0.5 ms). Accordingly, an updated requested user image may be periodically captured by the camera 18 and transferred to the authenticating user PC. Alternatively, the authenticating user PC 300 may receive a still image imaged immediately before transmitting the authentication request and display the still image.

The authentication button 703 is a button that the authenticating user presses to authenticate the requesting user. If the authentication button 703 is pressed, the authenticating user PC 300 notifies the image forming apparatus 100 of the fact that the authentication is accepted as an authentication result OK. The rejection button 704 is a button that the authenticating user presses when rejecting the authentication of the requesting user. If the rejection button 704 is pressed, the authenticating user PC 300 notifies the image forming apparatus 100 of the fact that the authentication is rejected as an authentication result NG.

Figure 8:
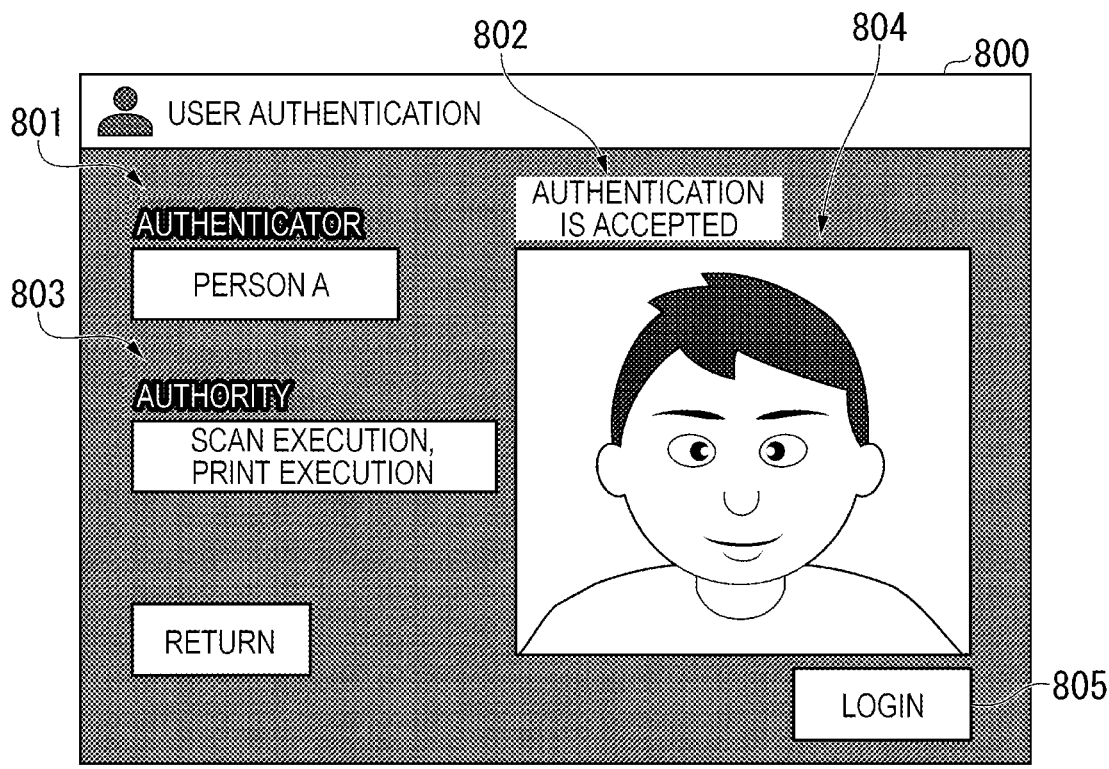
FIG. 8 is a diagram illustrating an example of an authentication OK screen.

If the authentication result is acquired, the image forming apparatus 100 displays an authentication result screen corresponding to the authentication result. If the authentication result OK is acquired, an authentication OK screen is displayed. FIG. 8 is a diagram illustrating an example of an authentication OK screen 800. As represented in the example of the authentication OK screen 800, an authenticating user field 801, an authentication result display 802, an authority field 803, an authenticating user image 804, and a login button 805 are displayed on the authentication OK screen.

The example of the authentication OK screen 800 illustrates an example of a screen if the requesting user selects person A as the authenticating user. The authenticating user field 801 allows the requesting user to check the authenticating user that the requesting user chooses. The requesting user can check that the authentication is accepted by "authentication is accepted" represented in the authentication result display 802. The authority field 803 indicates the authority granted to the requesting user. The authenticating user image 804 may be an image of the authenticating user prepared in advance, or may be a current image of the authenticating user imaged by the camera provided in the authenticating user PC 300. The login button 805 is a button for the requesting user to log in to the image forming apparatus 100. If the return button is selected, the selection screen is displayed. If the login button 805 is pressed, the image forming apparatus 100 allows the requesting user to log in with the granted authority. With this configuration, the requesting user can use the image forming apparatus 100.

Figure 9:
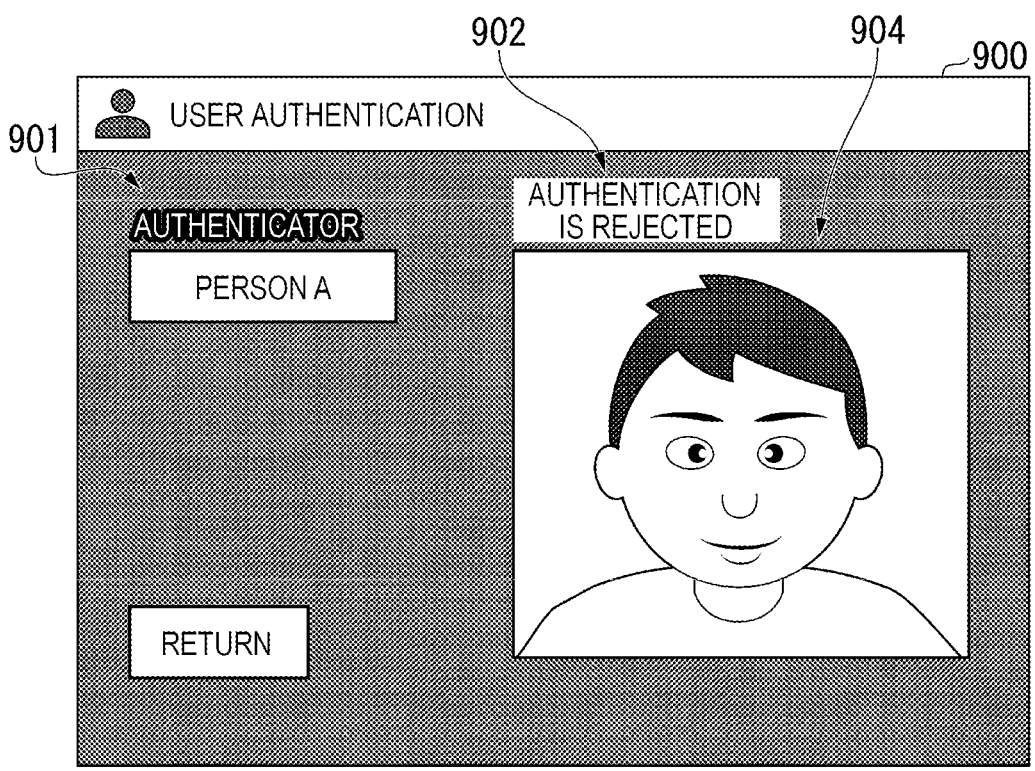
FIG. 9 is a diagram illustrating an example of an authentication NG screen.

If the authentication result NG is acquired, an authentication NG screen is displayed. FIG. 9 is a diagram illustrating an example of an authentication NG screen 900. As represented in the example of the authentication NG screen 900, an authenticating user field 901, an authentication result display 902, and an authenticating user image 804 are displayed on the authentication NG screen. Unlike the authentication OK screen, an authority field and a login button are not displayed on the authentication NG screen.

The example of the authentication NG screen example 900 illustrates an example of a screen if the requesting user selects person A as the authenticating user. The authenticating user field 901 allows the requesting user to check the authenticating user that the requesting user chooses. The requesting user can check that the authentication is rejected by "authentication is rejected" represented in the authentication result display 902. The authenticating user image 904 may be an image of the authenticating user prepared in advance, or may be a current image of the authenticating user imaged by the camera provided in the authenticating user PC 300. If the return button is selected, the selection screen is displayed.

Figure 10:
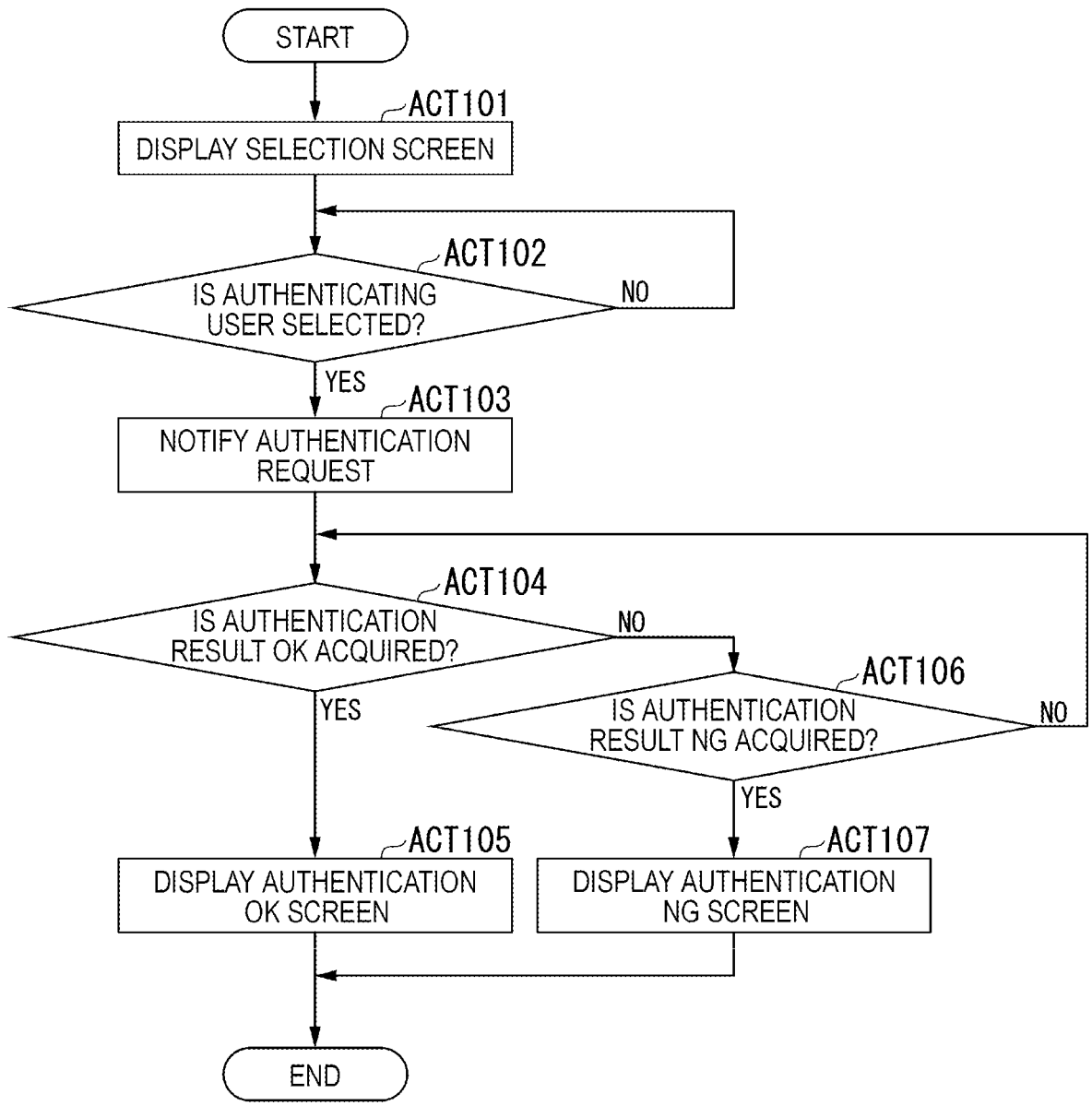
FIG. 10 is a flow chart illustrating a flow of a process of the image forming apparatus.

FIG. 10 is a flow chart illustrating a flow of a process of the image forming apparatus 100. The process illustrated in FIG. 10 is executed by the system controller 1 of the image forming apparatus 100. In FIG. 10, the image forming apparatus 100 displays the selection screen (see FIG. 5) if the requesting user inputs a request to display the selection screen (ACT 101). If the requesting user selects the authenticating user (YES in ACT 102), the image forming apparatus 100 makes a notification of an authentication request (ACT 103). A notification destination is the authenticating user PC 300 having a connection destination address corresponding to the selected authenticating user.

The image forming apparatus 100 determines whether the authentication result OK is acquired (ACT 104). If the authentication result OK is acquired (YES in ACT 104), the image forming apparatus 100 displays the authentication OK screen (see FIG. 8) (ACT 105), and ends the process. If the authentication result OK is not acquired (NO in ACT 104), the image forming apparatus 100 determines whether the authentication result NG is acquired (ACT 106). If the authentication result NG is acquired (YES in ACT 106), the image forming apparatus 100 displays the authentication NG screen (see FIG. 9) (ACT 107), and ends the process. If the authentication result NG is not acquired (NO in ACT 106), the image forming apparatus 100 returns to ACT 104.

Figure 11:
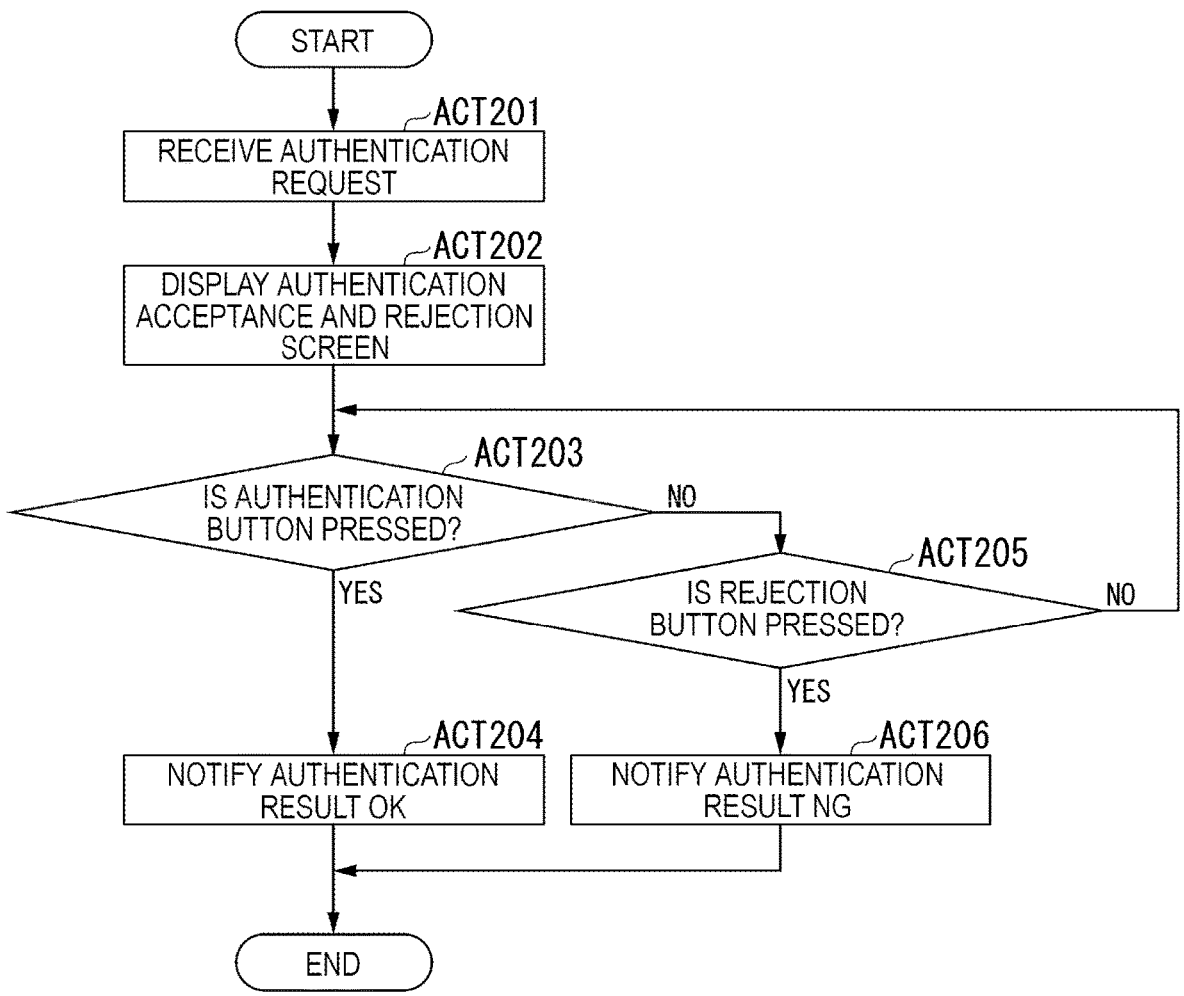
FIG. 11 is a flow chart illustrating a flow of an authenticating user PC.

FIG. 11 is a flow chart illustrating a flow of a process of the authenticating user PC 300. In FIG. 11, if the authentication request is received from the image forming apparatus 100 (ACT 201), the authenticating user PC 300 displays the authentication acceptance and rejection screen (see FIG. 7) (ACT 202). The authenticating user PC 300 determines whether the authentication button 703 is pressed (ACT 203). If the authentication button 703 is pressed (YES in ACT 203), the authenticating user PC 300 makes a notification of the authentication result OK (ACT 204), and ends the process. The notification destination is the image forming apparatus 100 that transmits the authentication request.

If the authentication button 703 is not pressed (NO in ACT 203), the authenticating user PC 300 determines whether the rejection button 704 is pressed (ACT 205). If the rejection button 704 is pressed (YES in ACT 205), the authenticating user PC 300 makes a notification of the authentication result NG (ACT 206), and ends the process. The notification destination is the image forming apparatus 100 that transmits the authentication request. If the rejection button 704 is not pressed (NO in ACT 205), the authenticating user PC 300 returns to ACT 203.

In the embodiment described above, the image of the requesting user is displayed on the authenticating user PC 300, but instead of or in addition to displaying the image of the requesting user, a voice call between the requesting user and the authenticating user may be enabled. By displaying an image and a voice call, more rigorous authentication can be performed. A text input may be received from the control panel 12. In this case, for example, by allowing the requesting user to input attributes such as date of birth and affiliation and transmitting the attributes to the authenticating user PC 300, the authenticating user can check and authenticate the input contents. In the case of authentication using only text input, a camera is not needed for the image forming apparatus 100, and thus the configuration of the image forming apparatus 100 can be simplified.

If there is only one authenticating user, only one authenticating user may be displayed on the selection screen (see FIG. 5), but the authentication in-progress screen (see FIG. 6) may be displayed without displaying the selection screen.

According to the embodiments described above, a user who is not set as the authentication target in advance can also be authenticated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
an image sensor configured to capture image data;
a user interface configured to:
  display a plurality of candidates for an authenticating user that is authorized to authenticate a requesting user; and
  receive, from the requesting user, a selection indicating the authenticating user from the displayed candidates; and
a controller operatively coupled to the image sensor and configured to:
  receive, from the image sensor, a requesting user image of the requesting user who requests authentication to use the image forming apparatus;
  transmit the requesting user image to a terminal associated with the authenticating user that is selected through the user interface; and
  acquire, from the terminal, an authentication result indicating whether the authenticating user authenticates the requesting user to use the image forming apparatus.

2. The image forming apparatus of claim 1, wherein the user interface is configured to display status information indicating whether each candidate is available to authenticate the requesting user.

3. The image forming apparatus of claim 1, wherein the user interface is configured to display a use authority that can be granted by each candidate available to authenticate the requesting user, the use authority indicating one or more functions of the image forming apparatus that the requesting user has permission to use.

4. The image forming apparatus of claim 1, wherein the user interface is configured to display an authenticating user image of the authenticating user.

5. The image forming apparatus of claim 4, wherein the user interface is configured to display the authenticating user image of the authenticating user between (a) when the requesting user image is transferred to the terminal and (b) when the authentication result is received from the terminal.

6. The image forming apparatus of claim 1, wherein the controller is configured to:
receive, from the image sensor, an updated requesting user image of the requesting user that is captured after the requesting user image is captured; and
transmit the updated requesting user image to the terminal.

7. The image forming apparatus of claim 1, wherein the image sensor is a camera.

8. An image forming apparatus comprising:
an image sensor configured to capture image data; and
a controller operatively coupled to the image sensor and configured to:
  receive, from the image sensor, a requesting user image of a requesting user who requests authentication to use the image forming apparatus;
  transmit the requesting user image to a terminal associated with an authenticating user that is authorized to authenticate the requesting user;
  acquire, from the terminal, an authentication result indicating whether the authenticating user authenticates the requesting user to use the image forming apparatus; and
  grant a first use authority to the requesting user in response to the authentication result indicating that the requesting user is authenticated, the first use authority indicating one or more functions of the image forming apparatus that the requesting user has permission to use, and the first use authority being based on a second use authority granted to the authenticating user who authenticates the requesting user.

9. The image forming apparatus of claim 8, wherein the one or more functions indicated by the first use authority are within the second use authority granted to the authenticating user.

10. The image forming apparatus of claim 8, wherein the first use authority indicates that the requesting user has permission to use a scanner function of the image forming apparatus.

11. The image forming apparatus of claim 8, wherein the first use authority indicates that the requesting user has permission to use a printer function of the image forming apparatus.

12. The image forming apparatus of claim 8, wherein the first use authority indicates that the requesting user has permission to use a copy function of the image forming apparatus.

13. The image forming apparatus of claim 8, wherein the first use authority indicates that the requesting user has permission to use a scanner function, a printer function, and a copy function of the image forming apparatus.

14. The image forming apparatus of claim 8, wherein the second use authority indicates that the authenticating user has permission to register new users to use the image forming apparatus.

15. A method for operating an image forming apparatus, the method comprising:
capturing, by an image sensor of the image forming apparatus, a requesting user image of a requesting user who requests authentication to use the image forming apparatus;
displaying, by a user interface, a plurality of candidates for an authenticating user that is authorized to authenticate the requesting user;
receiving, from the requesting user, a selection indicating the authenticating user from the displayed candidates;
transmitting the requesting user image to a terminal associated with the authenticating user that is that is selected through the user interface; and
acquiring, from the terminal, an authentication result indicating whether the authenticating user authenticates the requesting user to use the image forming apparatus.

16. The method of claim 15, further comprising:
  displaying, by the user interface, status information indicating whether each candidate is available to authenticate the requesting user.

17. The method of claim 15, further comprising:
  granting a first use authority to the requesting user in response to the authentication result indicating that the requesting user is authenticated, the first use authority indicating one or more functions of the image forming apparatus that the requesting user has permission to use, and the first use authority being based on a second use authority granted to the authenticating user who authenticates the requesting user.

* * * * *